(12) United States Patent
Hinzpeter et al.

(10) Patent No.: US 6,370,021 B1
(45) Date of Patent: Apr. 9, 2002

(54) OPERATING STAND FOR A TABLET PRESS DEVICE

(75) Inventors: Jürgen Hinzpeter; Ulrich Zeuschner, both of Schwarzenbek; Elke Wittenberg, Gülzow; Peter Lüneburg, Berkenthin; Hans-Joachim Pierags, Reinsbek; Nils Petersen, Hohnstorf; Ulrich Arndt, Lauenburg; Hans Wolf, Schwarzenbek, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/551,071

(22) Filed: Apr. 18, 2000

(30) Foreign Application Priority Data

Apr. 22, 1999 (DE) .......................... 199 18 298

(51) Int. Cl.[7] .................................. G06F 1/16
(52) U.S. Cl. ....................... 361/683; 361/740; 292/148; 312/216
(58) Field of Search ................. 361/683–686, 361/724–727, 740, 759; 248/551–553; 312/216, 218; 70/57, 58, 85; 292/42, 148, 151

(56) References Cited

U.S. PATENT DOCUMENTS

| 5,300,943 A | * | 4/1994 | Jakobs et al. ............... 345/173 |
| 5,751,548 A | * | 5/1998 | Hall et al. .................... 361/686 |
| 5,859,762 A | * | 1/1999 | Clark et al. .................. 361/686 |
| 5,908,979 A | * | 6/1999 | Miyamae .................... 73/12.14 |
| 6,125,028 A | * | 9/2000 | Matsumoto ................. 361/681 |

FOREIGN PATENT DOCUMENTS

DE 196 50 100 6/1998

* cited by examiner

Primary Examiner—Leo P. Picard
Assistant Examiner—Hung Van Duong
(74) Attorney, Agent, or Firm—Vidas, Arrett & Steinkraus, PA..

(57) ABSTRACT

An operating stand for a tablet press device which comprises a process computer with a screen and an input keyboard and where appropriate a printer, wherein the operating lectern is mounted height-adjustable on a traversable base and between the base and the operating lectern there is arranged a linear adjusting drive with a linear guide.

10 Claims, 1 Drawing Sheet

OPERATING STAND FOR A TABLET PRESS DEVICE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to an operating stand for a tablet press device.

Tablet presses usually comprise several units, at least one press, preferably a rotary press in a housing with the associated drive and control units, a switch cabinet and an operating panel which contains a process computer for the operation and control of the tablet press. Conventionally the operating panel with the operating elements is arranged rigidly on the tabletting machine. It is already also known to provide a separate operating stand which has a greater or lesser distance to the tablet press.

On account of differing body sizes of the operator the operation and observation of the operating panel and/or the screen is of a differing comfort. In particular the observation of the screen may be problematic if it is arranged at an inconvenient height.

It is the object of the invention to provide an operating stand for a tablet press device, which permits an individual adjustment adapted to the operator.

BRIEF SUMMARY OF THE INVENTION

With the invention an operating lectern is mounted adjustable in height on a traversable stand. The operator may as a result set up the lectern at a desired location and displace the setting-up location according to the operating conditions. Essential to the invention is that between the actual operating lectern and the traversable stand there is arranged a linear adjusting drive. This adjusting drive is formed such that it either simultaneously has a linear, rigid guide or cooperates with a linear, rigid guide. By way of this the guide at the same time forms the stable connection and support between the operating lectern and the base. Fluctuations of the operating lectern with respect to the base are likewise avoided as with a jamming with a height adjustment.

The linear drive is preferably electric, contains as a result an electric motor, whose rotational movement is converted into a linear one. Such adjusting drives are known from the state of the art.

The control of the linear adjusting drive is effected via the operating lectern or the process computer, in that the operator, e.g. operates the input keyboard or a touch-screen.

In the process computer there are stored a multitude of height adjustments which are allocated to certain operators. By way of inputting for example a password via the keyboard or the touch-screen the process computer automatically adjusts the operating lectern and brings it to the individual height.

According to one embodiment of the invention on the lower side of the operating lectern there is arranged a column-like covering section which cooperates telescopically with a column-like covering section of the stand. The linear adjusting drive is as a result surrounded by the covering sections and is therefore protected against mechanical effects and dust.

The traversable stand preferably comprises a row of rollers. Mostly a roller may be provided with an electromagnetically actuable brake which may be actuated or released via a control command which e.g. may be inputted via the keyboard or the touch screen.

The design construction of the operating lectern may be of various types. Particularly advantageous is the arrangement of a lectern-like housing section on whose rear side there is arranged a flat housing section inclined slightly to the rear on whose surface facing the lectern-like housing section there are arranged a touch screen and an input keyboard. The lectern-like housing section may accommodate the actual computer and where appropriate a printer.

BRIEF DESCRIPTION OF THE SEVERAL VIEWS OF THE DRAWINGS

The invention is hereinafter described in more detail by way of one embodiment example shown in a drawing.

The single FIGURE shows perspectively an operating lectern according to the invention.

DETAILED DESCRIPTION OF THE INVENTION

Figure 1:
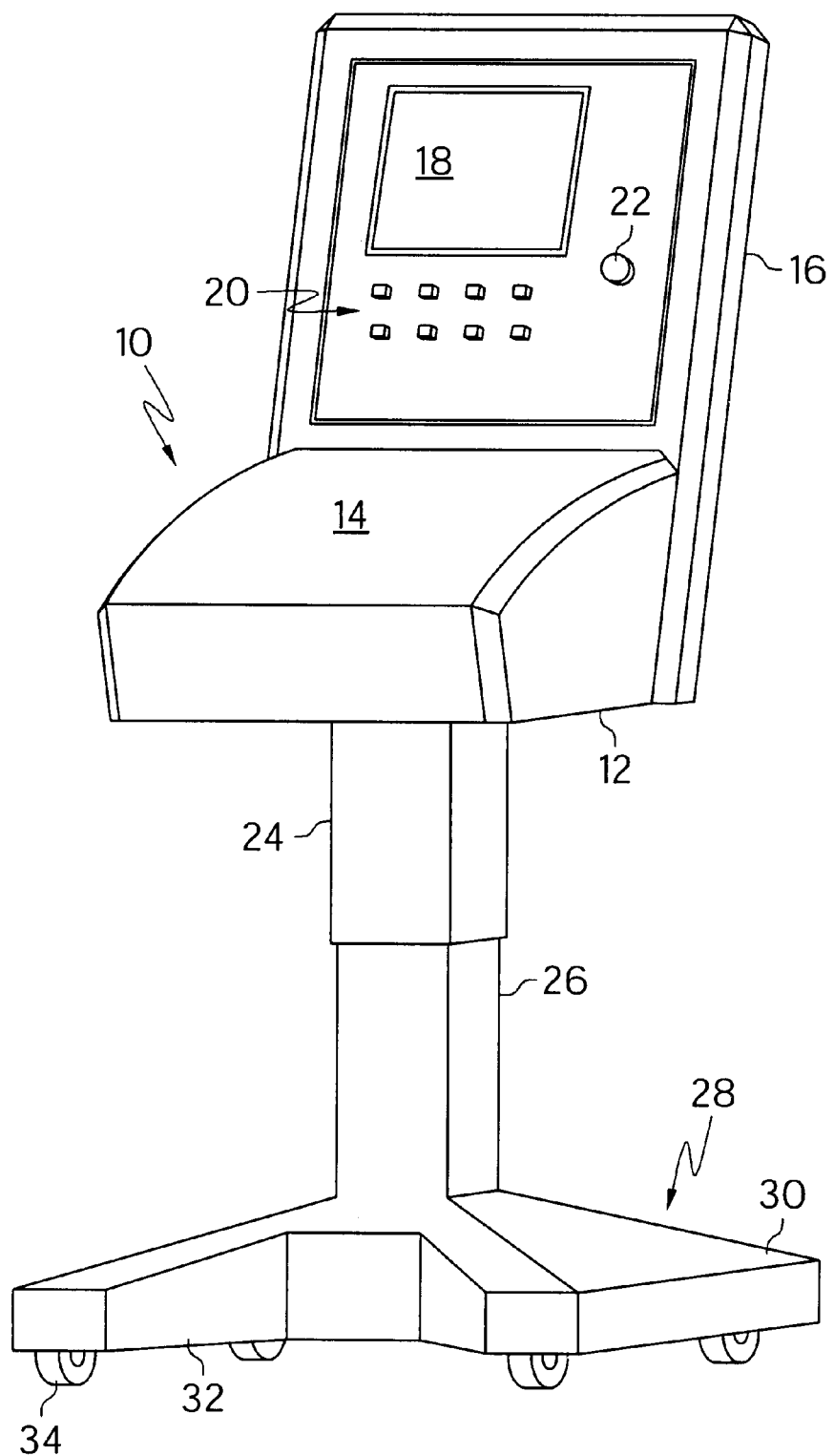

While this invention may be embodied in many different forms, there are described in detail herein a specific preferred embodiment of the invention. This description is an exemplification of the principles of the invention and is not intended to limit the invention to the particular embodiment illustrated.

The operating lectern 10 according to the figure comprises a lectern-like housing section 12 with a slightly convexly curved lectern surface 14. On the rear side of the lectern-like housing section 12 there is arranged a flat housing section 16 which with respect to the vertical is slightly inclined to the rear and on its side facing the lectern-like housing section 12 comprises a touch-screen, an input keyboard 20 as well as an emergency stop switch 22. The lectern-like housing section 14 may apart from the computer also contain a printer which however is not shown. The operating lectern 10 as a whole serves for operating a non-shown tablet press which for example contains a rotary press. Such tabletting machines are generally known and are applied in a large scope in the pharmaceutic industry.

Below the lectern-like housing section 12 there is attached a column-like covering section 24 which telescopically cooperates with a column-like covering section 26 of a traversable base 28. Within the covering section 24, 26 there is located a linear adjusting drive with a rigid, linear guide for height adjustment of the operating lectern 10 relative to the traversable base 28. The adjusting drive is shown just as little as its connection to the part to be actuated. The control of the adjusting drive is effected selectively via the keyboard 20 or the touch-screen 18, wherein in the process computer, values may be stored which are allocated to certain operating persons. By way of inputting a certain data which is characteristic for the operating person the operating lectern 10 may be traversed to the optimal height in that the process computer gives a suitable control command to the adjusting drive. By way of this it is possible the set the operating lectern ergonomically to the respective operator, who as is known monitors and operates the press device whilst standing.

The traversable base 28 comprises a covering 30 which consists of a four-sided pyramid-like roof section and a flat box section arranged thereunder, which on the front side, i.e. below the housing section 14 comprises a trapezoidal relief 32. This permits the close approach of the operating person without being disturbed by the base 28 or the covering 30. At the four corners of the base 28 there are provided rollers 34, wherein at least to at least one roller 34 there may be allocated a brake which however is not shown. The brake is preferably electromagnetically actuable and controllable via the process computer in the operating stand, for example by actuation of the keyboard 20 or of the touch screen 18.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A control stand for a tablet press device, comprising:
   a control panel including a process computer, the process computer including a screen and an input keyboard;
   a carriage adapted to be moved on the ground;
   the control panel being supported on the carriage through actuator means, the actuator means being linear actuating means and moving the control up and down along linear guide means;
   the process computer being adapted to store different data for the height of the control panel, the data being associated with individual operators for the control panel, the linear actuator means moving the control panel to a predetermined height upon inputting an operator referenced data into the computer via the keyboard.

2. The control stand according to claim 1, in which on a lower side of the control panel there is arranged a column-like covering section (24) which telescopically cooperates with a column-like covering section (26) of the base (28).

3. The control stand according to claim 1, in which the linear actuator is controllable by actuating the keyboard (20) of the process computer.

4. The control stand according to claim 1, in which the linear actuator is controllable by a touch screen (18) of the process computer.

5. The control stand according to claim 1, in which the carriage includes at least one roller (34) and wherein the at least one roller (34) comprises an electromagnetically actuable brake which is actuable or releasable by a control command inputted into the process computer.

6. The control stand according to claim 1, in which there is provided a lectern-like housing section (12) including a rear side on which is arranged a slightly rearwardly inclined flat housing section (16) which projects upwards beyond the lectern-like housing section (12), the section (16) including a surface facing the lectern-like housing section (12) on which there is arranged a touch screen (18) and an input keyboard (20).

7. The control stand according to claim 1, further including a printer.

8. The control stand according to claim 2, in which the column-like covering sections (24, 26) in cross section are quadratic.

9. The control stand according to claim 5 wherein the control command is input into the process computer by the keyboard (20).

10. The control stand according to claim 5 wherein the control command is input into the process computer by a touch screen (18).

* * * * *